United States Patent [19]

Cavitt et al.

[11] Patent Number: 4,721,743
[45] Date of Patent: Jan. 26, 1988

[54] NON-THERMOSET THERMALLY STABLE CAPPED EPOXY RESIN COMPOSITIONS

[75] Inventors: Michael B. Cavitt, Lake Jackson, Tex.; Christopher V. Beasley, Chicago, Ill.

[73] Assignee: The Dow Chemical Company, Midland, Mich.

[21] Appl. No.: 899,455

[22] Filed: Aug. 22, 1986

Related U.S. Application Data

[63] Continuation-in-part of Ser. No. 715,305, Mar. 25, 1985, abandoned, which is a continuation-in-part of Ser. No. 677,781, Dec. 4, 1984, abandoned.

[51] Int. Cl.$^4$ .................... C08K 7/20; C08L 63/00; C08L 63/02
[52] U.S. Cl. .................... 523/427; 523/466; 523/172; 525/523; 525/524; 528/103; 528/104
[58] Field of Search .............. 525/523, 528, 533, 524; 523/172, 427, 466; 528/103, 104, 89, 93, 96, 100

[56] References Cited

U.S. PATENT DOCUMENTS

| | | | |
|---|---|---|---|
| 3,427,990 | 11/1969 | Dante et al. | 260/47 |
| 3,547,881 | 12/1920 | Mueller et al. | 260/47 |
| 3,547,885 | 12/1970 | Dante et al. | 528/89 |
| 3,632,836 | 1/1974 | Walker | 260/830 R |
| 3,787,508 | 1/1974 | Walker | 260/613 R |
| 3,843,605 | 10/1974 | Schmidt et al. | 260/49 |
| 4,048,141 | 9/1977 | Doorakian et al. | 526/266 |
| 4,145,324 | 3/1979 | Chen | 260/29.4 R |
| 4,354,015 | 12/1982 | Doorakian et al. | 528/104 |
| 4,438,254 | 3/1984 | Doorakian et al. | 528/104 |

OTHER PUBLICATIONS

Dale et al., "Developement of Lane Delineation with Improved Durability", Report No. FHWA-R0-75-70, Jul. 1975.

*Primary Examiner*—Allan M. Lieberman

[57] ABSTRACT

A heat stable, non-thermoset epoxy resin composition is disclosed which comprises reacting (A) a mixture containing (1) a relatively high molecular weight epoxy resin and (2) a relatively low molecular weight epoxy resin with (B) a monohydric phenol, a monocarboxylic acid or anhydride thereof or a monohydric alcohol. The composition does not exhibit an excessive viscosity increase at elevated temperatures making it particularly suitable for use in highway marking paint applications.

10 Claims, No Drawings

NON-THERMOSET THERMALLY STABLE CAPPED EPOXY RESIN COMPOSITIONS

CROSS REFERENCE TO RELATED APPLICATION

This application is a continuation-in-part of copending application Ser. No. 715,305 filed Mar. 25, 1985 which is a continuation-in-part of application Ser. No. 677,781 filed Dec. 4, 1984 (both now abandoned).

BACKGROUND OF THE INVENTION

The present invention concerns non-thermoset, thermally stable, capped epoxy resin compositions and coatings prepared therefrom.

Thermoplastic (non-thermoset) epoxy resins have been employed in the formulation of highway, pavement, marking paints as disclosed by J. M. Dale in *DEVELOPMENT OF LANE DELINEATION WITH IMPROVED DURABILITY*, Report No. FHWA-RD-75-70, July 1975. The paint formulations are maintained at elevated temperatures, about 450° F. (232° C.), during application. While they provide an excellent high marking paint in terms of abrasive resistance, they are deficient in terms of applicability since they exhibit a substantial increase in viscosity while being maintained at the application temperature.

The present invention provides a non-thermoset epoxy resin which exhibits a much reduced viscosity increase at elevated temperatures, i.e. more stable.

SUMMARY OF THE INVENTION

The present invention pertains to a thermally stable, non-thermoset resin having a Mettler softening point of from about 75° C. to about 110° C., preferably from about 88° C. to about 95° C. and a Brookfield Thermosel viscosity at 450° F. of from about 150 cps to about 260 cps, preferably from about 200 cps to about 250 cps prepared by reacting in the presence of an effective quantity of a suitable catalyst (A) a mixture comprising
 (1) from about 65 to about 80, preferably from about 73 to about 76, percent by weight of a relatively high molecular weight epoxy resin having an average of more than one vicinal epoxide group per molecule and an epoxide equivalent weight (EEW) of from about 1600 to about 2300, preferably from about 1700 to about 1900; and
 (2) from about 35 to about 20, preferably from about 27 to about 24, percent by weight of a relatively low molecular weight epoxy resin having an average of more than one vicinal epoxide group per molecule and an EEW of from about 180 to about 225, preferably from about 180 to about 190;
 wherein the equivalent weight of components (1) and (2) are calculated on the basis that the epoxy resin contains only carbon, oxygen and hydrogen atoms even though it may contain other atoms; with
(B) at least one monofunctional material selected from monohydric phenols, aliphatic alcohols having from about 3 to about 8 carbon atoms, aliphatic monocarboxylic acids, said anhydrides having from about 12 to about 20 carbon atoms, anhydrides of aliphatic monocarboxylic acids having from about 4 to about 8 carbon atoms, aromatic substituted aliphatic monocarboxylic acids having from about 8 to about 10 total carbon atoms and combinations thereof; and
wherein components (A) and (B) are employed in quantities which provide an equivalent ratio of component (B) to component (A) of from about 0.87:1 to about 1.1:1, preferably from about 0.95:1 to about 1.1:1 except when component (B) is an aliphatic alcohol, then the equivalent ratio of component (B) to component (A) is from about 3.5:1 to about 20:1, preferably from about 4:1 to about 10:1, most preferably from about 4:1 to about 6:1, with the proviso that the amount of components (A-1) and (A-2) and the ratio of components (A) and (B) are such that the desired Mettler softening point and Brookfield Thermosel viscosity are obtained.

The present invention also pertains to a paint formulation comprising
(A) the aforementioned thermally stable non-thermoset resin; and
(B) at least one of
 (1) one or more pigments or dyes; or
 (2) one or more fillers.

DETAILED DESCRIPTION OF THE INVENTION

It is desirable in the highway marking area to have a thermoplastic (non-thermoset) material that may be applied to the highway with existing equipment. The present invention provides a non-thermoset material with the additional benefit of the capability of being applied with existing equipment. In addition to being thermally stable, the highway marking material (without fillers, pigments, glass beads or other additives) should have a softening point of about 75° C. to about 110° C. and a viscosity at 232° C. of from about 150 cps to about 260 cps. This viscosity range is necessary to have a material which when formulated with fillers, pigments, glass beads or other additives can be applied with existing conventional equipment and also decreases or eliminates the settling of the fillers, pigments, glass beads or other additives before application to the pavement surface. Another aspect of viscosity is that if the viscosity varies from the above cited ranges, undesired settling of the reflective glass beads can occur after application. The material should have a softening point above about 75° C. so that it can be applied in warm climates. Materials having a softening point substantially below about 75° C. have a tendency to become tacky and pick up road grime and become off-color which leads to limited visibility. At softening points greater than about 110° C., the material becomes difficult to melt and the viscosity exceeds the limits of the application equipment.

Suitable epoxy resins which can be employed in the process of the present invention include, for example, those represented by the formulas

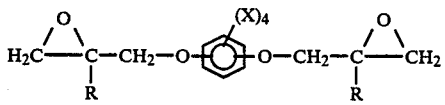

I.

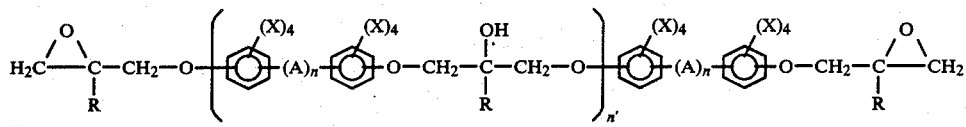

wherein each A is independently a divalent hydrocarbyl group having from 1 to about 10, preferably from 1 to about 6 carbon atoms; each R is independently hydrogen or a hydrocarbyl group having from 1 to about 4 carbon atoms; each X is independently hydrogen, a halogen, preferably chlorine or bromine, or a hydrocarbyl group having from 1 to about 12 carbon atoms; n has a value of zero or 1 and n' has an average value of from about 0.07 to about 15, preferably from about 0.07 to about 12.2.

Particularly suitable epoxy resins include the glycidyl ethers of polyhydric phenols such as resorcinol, catechol, hydroquinone, bisphenol A, bisphenol F, mixtures thereof and the like.

Suitable polyhydric phenolic compounds which can be employed to prepare relatively high molecular weight epoxy resins by advancing a relatively low molecular weight epoxy resin include, for example, those represented by the formulas

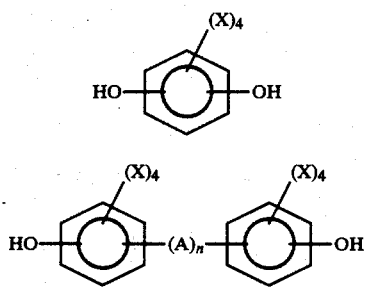

wherein A, X and n are as hereinbefore defined.

Particularly suitable polyhydric phenolic materials include, for example, resorcinol, catechol, hydroquinone, bisphenol A, bisphenol F, mixtures thereof and the like.

Suitable monohydric phenolic compounds include, for example, those represented by the formula

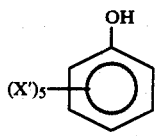

and each X' is independently hydrogen, a halogen, preferably chlorine or bromine, or a hydrocarbyl or hydrocarbyloxy group having from 1 to about 12 carbon atoms.

Particularly suitable monohydric phenolic materials include, for example, phenol, alkylphenols, such as p-nonylphenol, p-t-butylphenol, o-cresol, m-cresol, p-cresol, 2,4-xylenol, 2,5-xylenol, 3,4-xylenol and 3,5-xylenol, alkoxyphenols such as, for example, o-methoxyphenol, p-methoxyphenol, combinations thereof and the like.

Suitable monohydric alcohols which can be employed herein include, for example, methanol, ethanol, propanol, isopropanol, butanol, pentanol, hexanol, heptanol, octanol, combinations thereof and the like.

Suitable monocarboxylic acids which can be employed herein include, for example, lauric acid, myristic acid, palmitic acid, stearic acid, oleic acid, phenylacetic acid, methoxyphenyl acetic acid, methoxyphenoxy acetic acid, toluic acid, combinations thereof and the like.

Suitable anhydrides of monocarboxylic acids which can be employed herein include, for example, acetic anhydride, propionic anhydride, butyric anhydride, combinations thereof and the like.

Suitable catalysts for effecting the reaction between the epoxy resin and the phenolic hydroxyl-containing materials include, for example, those disclosed in U.S. Pat. Nos. 3,306,872; 3,341,580; 3,379,684; 3,477,990; 3,547,881; 3,637,590; 3,843,605; 3,948,855; 3,956,237; 4,048,141; 4,093,650; 4,131,633; 4,132,706; 4,171,420; 4,177,216 and 4,366,295, all of which are incorporated herein by reference.

Particularly suitable catalysts are those quaternary phosphonium and ammonium compounds such as, for example, ethyltriphenylphosphonium chloride, ethyltriphenylphosphonium bromide, ethyltriphenylphosphonium iodide, ethyltriphenylphosphonium acetate, ethyltriphenylphosphonium diacetate (ethyltriphenylphosphonium acetate.acetic acid complex), tetrabutylphosphonium chloride, tetrabutylphosphonium bromide, tetrabutylphosphonium iodide, tetrabutylphosphonium acetate, tetrabutylphosphonium diacetate (tetrabutylphosphonium acetate.acetic acid complex), butyltriphenylphosphonium tetrabromobisphenate, butyltriphenylphosphonium bisphenate, butyltriphenylphosphonium bicarbonate, benzyltrimethylammonium chloride and tetramethylammonium hydroxide.

Other suitable catalysts include tertiary amines such as, for example, triethylamine, tripropylamine, tributylamine, 2-methylimidazole, benzyldimethylamine, N-methyl morpholine, mixtures thereof and the like.

Suitable pigments which can be employed herein include any which will provide the coating with the deisred color such as, for example, titanium dioxide, lead chromate, zinc chromate, chrome green, pthalocyamine green and blue, iron oxide, combinations thereof and the like.

Suitable fillers which can be employed herein include, for example, calcium carbonate, talc, glass beads, powdered or flaked zinc or alumina, powdered or flaked glass, colloidal silica, combinations thereof and the like.

The following examples are illustrative of the present invention, but are not to be construed as to limiting the scope thereof in any manner.

In the examples and comparative experiments, the viscosities are Brookfield Thermosel viscosities and the softening points are Mettler softening points.

ABRASION TEST

The abrasion test was conducted on a Teledyne Taber Abraser Model No. 503 using CS-10 grind stones with a 1 kg mass added to each grind stone arm. The rotation speed was 1.2 cycles per second. The grind stones were cleaned by letting the stones roll over sand paper for 10 cycles then the sand paper was replaced with the sample to be evaluated. The test sample mass was determined before and after abrasion to determine the mass loss. The samples were prepared by mixing the test resin with filler, pigment and glass beads. This mixture was placed into a 200° C. oven and melted and mixed together. This mixture was poured onto a preheated 4"×4"×20 gauge (101.6 mm×101.6 mm×0.95 mm) cold rolled steel panel and then placed in a 200° C. oven for 5 min. (300 s). The panel was then removed from the oven and allowed to cool overnight prior to testing.

EXAMPLE 1

A. Preparation of Capped Epoxy Resin

To a reaction vessel equipped with a means for stirring and temperature control was added 37.1 lbs (16.8 kg, 10.2 gram epoxy equiv.) of a diglycidyl ether of bisphenol A having an epoxide equivalent weight (EEW) of 1646, 18 lbs (8.2 kg, 43.8 gram epoxy equivalents) of a diglycidyl ether of bisphenol A having an EEW of 187, 23 lbs (10.4 kg, 47.3 gram hydroxyl equiv.) of nonyl phenol and 0.077 lbs (0.169 kg) of a 70% solution of ethyltriphenyl phosphonium acetate.acetic acid complex in methanol. The ratio of equiv. of nonyl phenol to epoxy equiv. was 0.88:1. The mixture was heated to 160° C. at a rate of 1.5° C./min. (0.025° C./s) and maintained thereat for 2 hours (7200 s). The resultant product was a colorless to pale yellow resin, solid at room temperature, had a softening point of 81° C. and a viscosity of 150 cps (0.15 pa.s) at 450° F. (232° C.).

B. Preparation of Traffic Marking Paint

A mixture was prepared at 200° C. of the following components:
1. 100 parts by weight of the resin from (A) above
2. 20 parts by weight of TiO$_2$
3. 20 parts by weight of CaCO$_3$
4. 28 parts by weight of 200 mesh glass beads Components 1, 2 and 3 were mixed under high shear conditions. Component 4 was mixed at low speeds.

The properties of the traffic paint formulation are given in the following Table.

C.

For comparative purposes, a similar paint formulation was prepared from an epoxy resin mixture without nonyl phenol capping. The formulation was as follows:
1. 40 parts by weight of a diglycidyl ether of bisphenol A (DGEBA) having an EEW of 186–192
2. 60 parts by weight of a DGEBA having an EEW of 1600–2000
3. 20 parts by weight of TiO$_2$
4. 20 parts by weight of CaCO$_2$
5. 28 parts by weight of 200 mesh glass beads The properties are given in the following Table I.

TABLE I

| | Formulation 1-B Present Invention | Formulation 1-C Comparative |
|---|---|---|
| Mettler Softening Point, °C. | 89 | 77 |
| Cold flow at 25° C. | No | Yes |
| Initial Viscosity @ 450° F. | 505/0.505 | 480/0.480 |
| (232° C.), cps/pa.s | | |
| Viscosity after 8 hours | 510/0.51 | 1500/1.5 |
| (28800 s) at 450° F. | | |
| (232° C.), cps/pa.s | | |
| Condition after 24 hours | slight | gelled, |
| (86400 s) at 450° F. (232° C.) | yellowing | brown |

EXAMPLE 2

A. Preparation of Non-Capped Epoxy Resin Blend (Epoxy Resin Blend)

To a reaction vessel equipped with a means for stirring, nitrogen purge and temperature control was added 725.2 g (3.9 epoxy equiv.) of a diglycidyl ether of bisphenol A having an epoxide equivalent weight (EEW) of 186, 374.8 g (3.29 equiv.) of bisphenol A and then heated to 90° C. at which time 1.69 g (0.003 mole) of a 70% solution of ethyltriphenyl phosphonium acetate.acetic acid complex in methanol was added. The temperature was increased to 150° C. and then the reaction mass exothermed to 206° C. The temperature was maintained at 190° C. for 1 hour (3600 s). The percent epoxide was 2.48 (1734 EEW). To this material was added 528.4 g (2.84 epoxy equiv.) of a diglycidyl ether of bisphenol A having an EEW of 186, and the temperature decreased to 150° C. This product had a percent epoxide of 9.1 (473 EEW). The mixture contained 67.6 wt.% of a 1734 EEW epoxy resin and 32.4 wt.% of a 186 EEW epoxy resin.

B. Preparation of Capped Epoxy Resin

To a reaction vessel equipped with a means for stirring and temperature control was added 150 g (0.32 epoxy equiv.) of epoxy resin blend prepared in A above, 100 g (1.35 mole) of n-butanol and heated to 50° C. whereupon 0.3 g (0.002 mole) of boron trifluoride etherate was added. The equiv. ratio of n-butanol to epoxy equiv. was 4.22:1. The temperature was increased to 60° C. and maintained at 60°–63° C. for 3.17 hours (11412 s), heated to 200° C. and vacuum stripped for 2.08 hours (7488 s). The product was dried in a vacuum oven at 160° C. for 2 hours (7200 s). The viscosity was 189.5 cps (01895 pa.s) at 450° F. (232° C.) and had a softening point of 78° C.

EXAMPLE 3

To a reaction vessel equipped with a means for stirring and temperature control was added 97 g of propylene glycol monomethyl ether acetate, 8 g (0.078 mole) of acetic anhydride, 70 g (0.074 epoxy equiv.) of a 50% solution of epoxy resin blend prepared in Example 2A in propylene glycol monomethyl ether acetate and 0.25 g (0.0009 mole) of a 70% solution of ethyltriphenyl phosphonium acetate.acetic acid complex in methanol. The ratio of equiv. of acetic anhydride to epoxy equiv. was 1.05:1. The temperature was increased to 120° C. and maintained for 5.2 hours (18,720 s). A portion of the solvent was removed by heating at 145° C. for about 0.5 hour (1800 s). The resultant material was then placed on a hot plate for 1 hour (3600 s) at 206° C. The product was dried in a vacuum oven at 160° C. for 2 hours (7200 s). The viscosity was 154 cps (0.154 pa.s) at 450° F. (232° C.) and had a softening point of 79.5° C.

EXAMPLE 4

To a reaction vessel equipped with a means for stirring and temperature control was added 197 g (1.042 epoxy equiv.) of a diglycidyl ether of bisphenol A having an EEW of 189 and 103 g (0.904 equiv.) of bisphenol A. After heating the mixture to 90° C., 0.46 g (0.0009 mole) of a 70% solution of tetra n-butylphosphonium acetate.acetic acid complex in methanol was added. The temperature was increased to 180° C. and maintained thereat for 1.25 hours (4500 s). The EEW of the resultant advanced epoxy resin was 2251. To this material was added 100 g (0.529 epoxy equiv.) of a diglycidyl ether of bisphenol A having an EEW of 189 and 178 g (0.654 equiv.) of stearic acid. The ratio of equiv. of stearic acid to epoxy equiv. was 0.996:1. The material was reacted an additional 2.08 hours (7488 s) at 180° C. The viscosity was 228 cps (0.228 pa.s) at 450° F. (232° C.) and had a softening point of 106.9° C.

EXAMPLE 5

To a reaction vessel equipped with a means for stirring and temperature control was added 197 g (1.042 epoxy equiv.) of a diglycidyl ether of bisphenol A having an EEW of 189 and 103 g (0.904 equiv.) of bisphenol A. After heating the mixture to 90° C., 0.46 g (0.0009 mole) of a 70% solution of tetra n-butylphosphonium acetate.acetic acid complex in methanol was added. The temperature was increased to 180° C. and maintained thereat for 1.37 hours (4932 s). The EEW of the resultant advanced epoxy resin was 2205. To this material was added 100 g (0.529 epoxy equiv. of a diglycidyl ether of bisphenol A having an EEW of 189 and 131.2 g (0.656 equiv.) of lauric acid. The ratio of equiv. of lauric acid to epoxy equiv. was 0.986:1. The material was reacted an additional 1.78 hours (6408 s) at 180° C. The viscosity was 247 cps (0.247 pa.s) at 450° F. (232° C.) and had a softening point of 79.7° C.

EXAMPLE 6

The uncapped epoxy resin blend of Example 2A and the capped epoxy resins prepared in Examples 3, 4 and 5 were subjected to a thermal stability test. The results are given in the following Table II.

TABLE II

THERMAL STABILITY TEST
Test Temperature 450° F. (232° C.)

| EPOXY RESIN | TIME AT 450° F. (232° C.) | VISCOSITY cps/pa.s |
| --- | --- | --- |
| Epoxy Resin Blend* of Ex. 2A | Initial | 209/0.209 |
|  | 7 hours (25,200 s) | 538/0.538 |
| Example 3 | Initial | 154/0.154 |
|  | 7 hours (25,200 s) | 173/0.173 |
| Example 4 | Initial | 228/0.228 |
|  | 7 hours (25,200 s) | 231/0.231 |
| Example 5 | Initial | 247/0.247 |
|  | 7 hours (25,200 s) | 249/0.249 |

*Not an example of the present invention.

EXAMPLE 7

Abrasion tests were conducted on two formulations as follows:

FORMULATION A

To a glass bottle was added 30.3 g of the diglycidyl ether of bisphenol A having an EEW of 1721, 10.01 g of the diglycidyl ether of bisphenol A having an EEW of 189, 10.99 g of 200 mesh (U.S. Standard Sieve Series) glass beads, 7.84 g of calcium carbonate, 7.85 g of titanium dioxide. The contents were melted at 200° in an oven and thoroughly mixed. The mixture was poured onto a cold rolled steel panel and cooled overnight. The resultant coating thickness was 1.968 mm. The formulation was subjected to an abrasion test. The results are given in the following Table III.

FORMULATION B

To a glass bottle was added 39.98 g of a mixture of 75% by weight of the diglycidyl ether of bisphenol A having an EEW of 1721 and 25% by weight of the diglycidyl ether of bisphenol A having an EEW of 189 which had been reacted with nonyl phenol in an amount which provided an equivalent ratio of nonyl phenol to epoxy resin of 1:1, 10.98 g of 200 mesh (U.S. Standard Sieve Series) glass beads, 7.84 g of calcium carbonate, 7.8 g of titanium dioxide. The contents were melted at 200° in an oven and thoroughly mixed. The mixture was poured onto a cold rolled steel panel and cooled overnight. The resultant coating thickness was 1.539 mm. The formulation was subjected to an abrasion test. The results are given in the following Table III.

TABLE III

| Cycles | Formulation A* mass loss, mg | Formulation B mass loss, mg |
| --- | --- | --- |
| 0 | 0 | 0 |
| 10 | 2.4 | 0.3 |
| 20 | 6.1 | 2.0 |
| 40 | 11.0 | 9.0 |
| 60 | 15.8 | 10.4 |
| 80 | 19.7 | 15.2 |
| 100 | 25.1 | 18.4 |
| 120 | 36.9 | 25.7 |
| 140 | 38.1 | 26.3 |
| 160 | 41.5 | 34.5 |
| 180 | 51.4 | 35.4 |
| 200 | 53.0 | 38.5 |
| 220 | 57.5 | 39.4 |
| 240 | 68.6 | 43.9 |
| 260 | 74.1 | 48.3 |
| 280 | 75.9 | 52.4 |
| 300 | 78.6 | 60.1 |
| 320 | 80.3 | 61.1 |
| 340 | N.T.** | 65.1 |
| 360 | N.T. | 69.4 |

*Not an example of the present invention
**N.T. means not tested

We claim:
1. A paint formulation comprising
(I) a thermally stable, non-thermoset resin having a Mettler softening point of from about 75° C. to about 110° C. and a Brookfield Thermosel viscosity at 450° F. of from about 150 cps to about 260 cps prepared by reacting in the presence of an effective quantity of a suitable catalyst
(A) a mixture comprising
(1) from about 65 to about 80 percent by weight of a relatively high molecular weight epoxy resin having an average of more than one vicinal epoxide group per molecule and an epoxide equivalent weight (EEW) of from about 1600 to about 2300; and
(2) from about 35 to about 20 percent by weight of a relatively low molecular weight epoxy resin having an average of more than one vicinal epoxide group per molecule and an EEW of from about 180 to about 225;
wherein the equivalent weight of components (1) and (2) are calculated on the basis that the epoxy resin contains only carbon, oxygen and hydrogen atoms even though it may contain other atoms; with (B) at least one monofunctional material selected from monohydric phenols, aliphatic alcohols having from about 3 to about 8 carbon atoms, aliphatic monocarboxylic acids having from about 12 to about 20 carbon atoms, anhydrides of aliphatic monocarboxylic acids, said anhydrides having from about 4 to about 8 carbon atoms, aromatic substituted aliphatic monocarboxylic acids having from about 8 to about 10 total carbon atoms and combinations thereof and wherein components (A) and (B) are employed in quantities which provide an equivalent ratio of component (B) to component (A) of from about 0.87:1 to about 1.1:1) except that when component (B) is an aliphatic alcohol, then the equivalent ratio of component (B) to component (A) is from about 3.5:1 to about 20:1; with the proviso that the amount of components (A-1) and (A-2) and the ratio of components (A) and (B) are such that the desired Mettler softening point and Brookfield Thermosel viscosity are obtained; and (II) at least one of
(a) one or more pigments;
(b) one or more dyes;
(c) one or more fillers; or
(d) any combination thereof.

2. A paint formulation of claim 1 wherein component I has a Mettler softening point of from about 88° C. to about 95° C. and a Brookfield Thermosel viscosity at 450° F. of from about 200 cps to about 250 cps and components (A) and (B) are employed in quantities which provide an equivalent ratio of component (B) to component (A) of from about 0.95:1 to about 1:1 except that when component (B) is an aliphatic alcohol, then the atomic ratio of component (B) to component (A) is from about 4:1 to about 10:1.

3. A paint formulation of claim 1 wherein
(i) component (A)(1) is an epoxy resin or a mixture of epoxy resins represented by the following formula II (ii) component (A)(2) is an epoxy resin or mixture of epoxy resins represented by formula II wherein A, R, X and n are as defined above and n' has an average value from about 0.07 to about 0.39; and (iii) in component (B) said monohydric phenolic compounds are represented by the following formula V

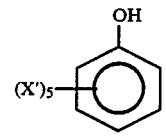

wherein each X' is independently hydrogen, a halogen, or a hydrocarbyl or hydrocarbyloxy group having from 1 to about 12 carbon atoms.

4. A paint formulation composition of claim 3 wherein
(i) component (A)(1) is one or more epoxy resins represented by formula II wherein each A is a divalent hydrocarbon group having from 1 to about 10 carbon atoms; each R is hydrogen, each X is hydrogen, chlorine or bromine; n has a value of 1 and n' has an average value from about 10.77 to about 12.18;

(ii) component (A)(2) is one or more epoxy resins represented by formula II wherein each A is a divalent hydrocarbon group having from 1 to about 10 carbon atoms; each R is hydrogen; each X is hydrogen, chlorine or bromine; n has a value of 1 and n' has an average value from about 0.07 to about 0.14; and (iii) component (B) is selected from phenol, o-cresol, m-cresol, p-cresol, p-tert-butylphenol, p-nonylphenol, 2,4-xylenol, 2,5-xylenol, 3,4-xylenol, 3,5-xylenol, o-methoxy phenol, p-methoxy phenol, stearic acid, lauric acid, acetic anhydride, butanol or a combination thereof.

5. A paint formulation of claim 4 wherein
(i) component (A)(1) is an epoxy resin represented by formula II wherein each A is a divalent hydrocarbyl group which has 3 carbon atoms and each X is hydrogen;

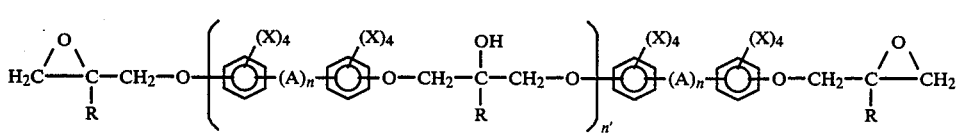

wherein each A is independently a divalent hydrocarbyl group having from 1 to about 10 carbon atoms; each R is independently hydrogen or a hydrocarbyl group having from 1 to about 4 carbon atoms; each X is independently hydrogen, a halogen or a hydrocarbyl group having from 1 to about 12 carbon atoms; n has a value of zero or 1 and n' has a average value from 10 to about 15;

(ii) component (A)(2) is an epoxy resin represented by formula II wherein each A is a divalent hydrocarbyl group which has 3 carbon atoms and each X is hydrogen; and (iii) component (B) is p-nonylphenol.

6. A paint formulation of claim 2 wherein
(i) component (A)(1) is an epoxy resin or a mixture of epoxy resins represented by the following formula II

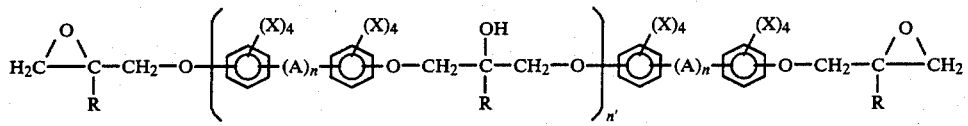

wherein each A is independently a divalent hydrocarbyl group having from 1 to about 10 carbon atoms; each R is independently hydrogen or a hydrocarbyl group having from 1 to about 4 carbon atoms; each X is independently hydrogen, a halogen or a hydrocarbyl or hydrocarbyloxy group having from 1 to about 12 carbon atoms; n has a value of zero or 1 and n' has a average value from 10 to about 15;

(ii) component (A)(2) is an epoxy resin or mixture of epoxy resins represented by formula II wherein A, R, X and n are as defined above and n' has an average value from about 0.07 to about 0.39; and (iii) in component (B) said monohydric phenolic compounds are represented by the following formula V

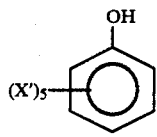

wherein each X' is independently hydrogen, a halogen, or a hydrocarbyl or hydrocarbyloxy group having from 1 to about 12 carbon atoms.

7. A paint formulation of claim 6 wherein
(i) component (A)(1) is one or more epoxy resins represented by formula II wherein each A is a divalent hydrocarbon group having from 1 to about 6 carbon atoms; each R is hydrogen; each X is hydrogen; chlorine or bromine; n has a value of 1; and n' has an average value from about 10.77 to about 12.18;

(ii) component (A)(2) is one or more epoxy resins represented by formula II wherein each A is a divalent hydrocarbon group having from 1 to about 10 carbon atoms; each R is hydrogen; each X is hydrogen, chlorine or bromine; n has a value of 1; and n' has an average value from about 0.07 to about 0.14; and (iii) component (B) is selected from phenol, o-cresol, m-cresol, p-cresol, p-tert-butylphenol, p-nonylphenol, 2,4-xylenol, 2,5-xylenol, 3,4-xylenol, 3,5-xylenol, o-methoxy phenol, p-methoxy phenol, stearic acid, lauric acid, acetic anhydride, butanol or a combination thereof.

8. A paint formulation of claim 7 wherein
(i) component (A)(1) is an epoxy resin represented by formula II wherein each A is a divalent hydrocarbyl group which has 3 carbon atoms and each X is hydrogen;

(ii) component (A)(2) is an epoxy resin represented by formula II wherein each A is a divalent hydrocarbyl group which has 3 carbon atoms and each X is hydrogen; and (iii) component (B) is p-nonylphenol.

9. A striping paint formulation comprising a paint formulation of claim 5 and glass beads.

10. A striping paint formulation comprising a paint formulation of claim 8 and glass beads.

* * * * *

UNITED STATES PATENT AND TRADEMARK OFFICE
CERTIFICATE OF CORRECTION

PATENT NO. : 4,721,743

DATED : January 26, 1988

INVENTOR(S) : Michael B. Cavitt and Christopher V. Beasley

It is certified that error appears in the above-identified patent and that said Letters Patent is hereby corrected as shown below:    Title page:

Under "References Cited", 2nd line; change "12/1920" to --12/1970--.

Under "Other Publications", 1st line; change "Developement" to --Development--.

Under "Other Publications", 2nd line; change "FHWA-RO-75-70" to --FHWA-RD-75-70--.

Col. 1, line 23; change "high" to --highway--.

Col. 4, line 50; change "deisred" to --desired--.

Col. 5, line 58; change "$CaCO_2$" to --$CaCO_3$--.

Col. 10, line 18, Claim 4; delete "composition".

Col. 12, line 9, CLaim 7; delete the semi-colon ";" after "hydrogen" and insert therefor a comma --,--.

Signed and Sealed this

Twenty-ninth Day of November, 1988

*Attest:*

DONALD J. QUIGG

*Attesting Officer*    *Commissioner of Patents and Trademarks*